INVENTOR.
Albert J. Sobey, Jr.
BY
ATTORNEY

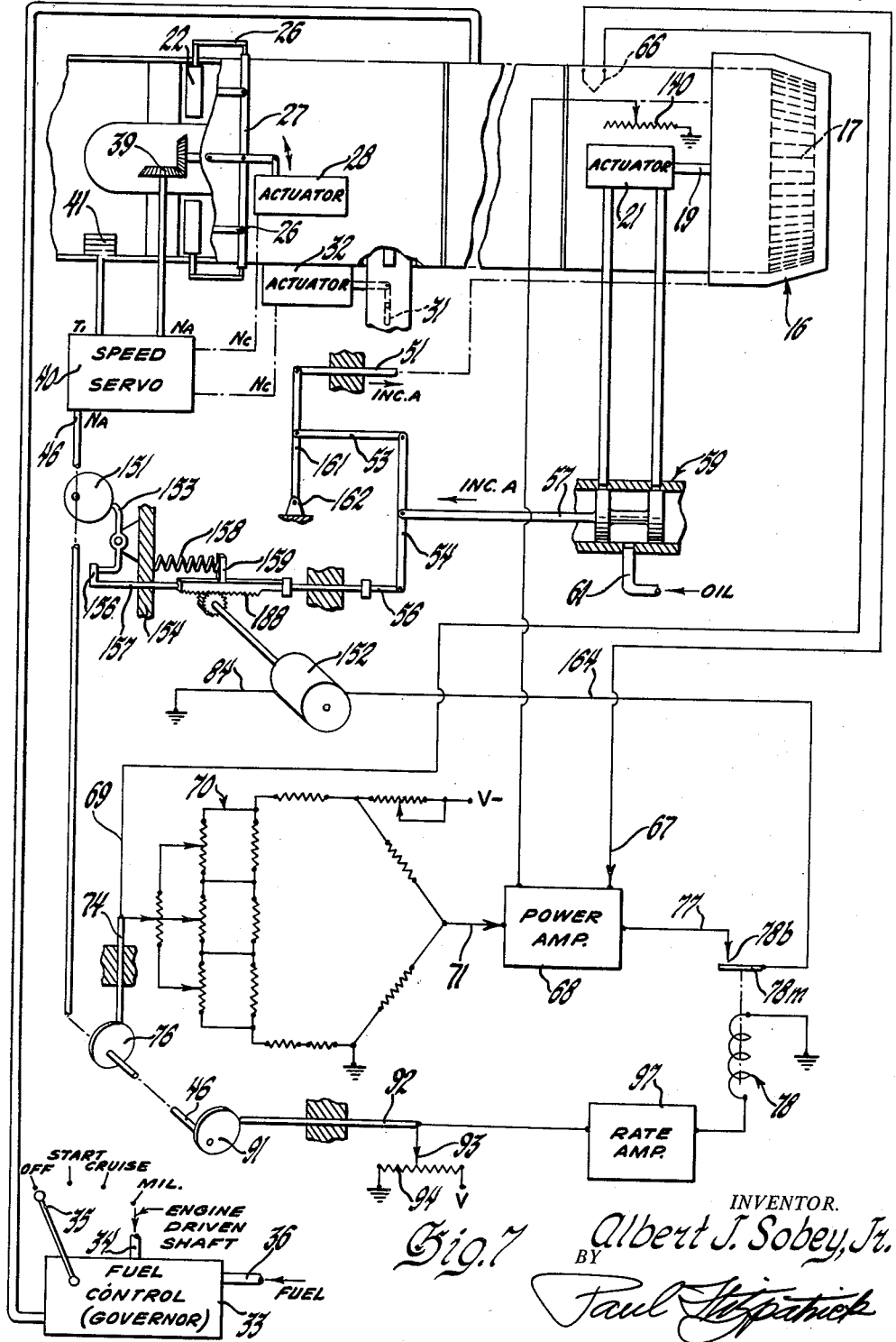

United States Patent Office 2,941,354
Patented June 21, 1960

2,941,354
VARIABLE JET NOZZLE CONTROL WITH AUXILIARY CONTROL OF GUIDE VANES AND COMPRESSOR BLEED

Albert J. Sobey, Jr., Indianapolis, Ind., assignor to General Motors Corporation, Detroit, Mich., a corporation of Delaware Filed Oct. 11, 1957, Ser. No. 689,582

18 Claims. (Cl. 60—35.6)

This invention relates to improvements in the controls of gas turbine jet propulsion engines. The most important part of the invention relates to controls of the variable jet nozzle of such an engine. Auxiliary features of the system involve control of variable inlet guide vanes or other variable vanes in the compressor of the engine and control of compressor bleed.

By way of background, it is well known that aircraft jet engines ordinarily comprise a compressor, a combustion system supplied with compressed air by the compressor in which fuel is burned to increase the temperature of the air, and a turbine driven by the combustion products and connected to the compressor to drive it. The combustion gases discharged from the turbine at high temperature and under significant pressure exhaust through a nozzle at high velocity. The acceleration of the air through the engine provides a reaction or thrust on the engine which propels the aircraft.

It has long been realized that the performance of such engines can be greatly improved by varying the area of the jet nozzle. Engine thrust may be varied by varying either fuel flow to the engine or nozzle area. Ordinarily, both are varied concurrently over part of the operating range of the engine.

It has also long been known that adaptation of the engine to off-design operating conditions, such as low engine speeds during starting and idling of the engine, can be greatly improved by either or both of two expedients. One of these may be referred to generally as variable geometry of the compressor, which ordinarily involves varying the setting angle of some of the stator vanes of the compressor; in some cases, only the setting of the inlet guide vanes. The other expedient involves means for bleeding or blowing off air at one or more stages of the compressor. In engines of high compression ratio, the use of both of these expedients may be required to achieve satisfactory starting and low speed running of the engine.

In previous engines of which I am aware, abrupt changes in the compressor guide vane angle, opening and closing of the compressor bleeds, and abrupt variations in the nozzle area created highly undesirable discontinuities in the thrust of the engine. Also, they adversely affected fuel regulation of the engine. One feature of this control system is a progressive variation in the compressor geometry, bleed valve opening, and nozzle area, each being changed from one limiting value to the other over a significant range of engine speed (the ranges preferably being non-coincident) so that there is no abrupt change in the mode of operation of the engine with consequent discontinuities in the thrust produced.

More important, however, is the principle or mode of operation of the nozzle area control, which is particularly adapted to obtaining the most favorable operation of the engine with respect to ability to increase thrust rapidly, maintenance of the desired turbine temperature, improvement in the fuel consumption of the engine for a given thrust, adaptability to varying conditions of inlet air temperature and aircraft speed, improved idling operation of the engine at altitude, more stable combustion, and protection against compressor surge or stall.

By way of introduction to the principles and operation of the nozzle area control, it may be summarized briefly and partially. The area of the nozzle is controlled basically so as to maintain a desired turbine temperature, the value of this temperature being scheduled to vary with the engine speed. Engine speed is a basic parameter of power output. Thus, as the pilot varies his fuel control to change the engine speed and thrust, a schedule of turbine temperature is established. Deviations from this schedule are caused to vary the nozzle area to hold the turbine temperature at the scheduled value. This control is effective during steady state operation of the engine. For reasons to be pointed out, it is not satisfactory during engine acceleration. The term "acceleration" is used herein to refer to either positive or negative rates of change of speed of the engine. During acceleration, the temperature control of the nozzle area is disabled and the nozzle is controlled in accordance with a schedule of area with relation to engine speed. In either mode of control, the area may vary progressively between the maximum area determined by the structure of the variable nozzle and the minimum area, or substantially the minimum.

The nature of the invention and the advantages thereof will be fully apparent to those skilled in the art from the succeeding detailed description of preferred embodiments thereof.

Figure 7 is a schematic diagram of a second embodiment of the invention.

Figure 1:
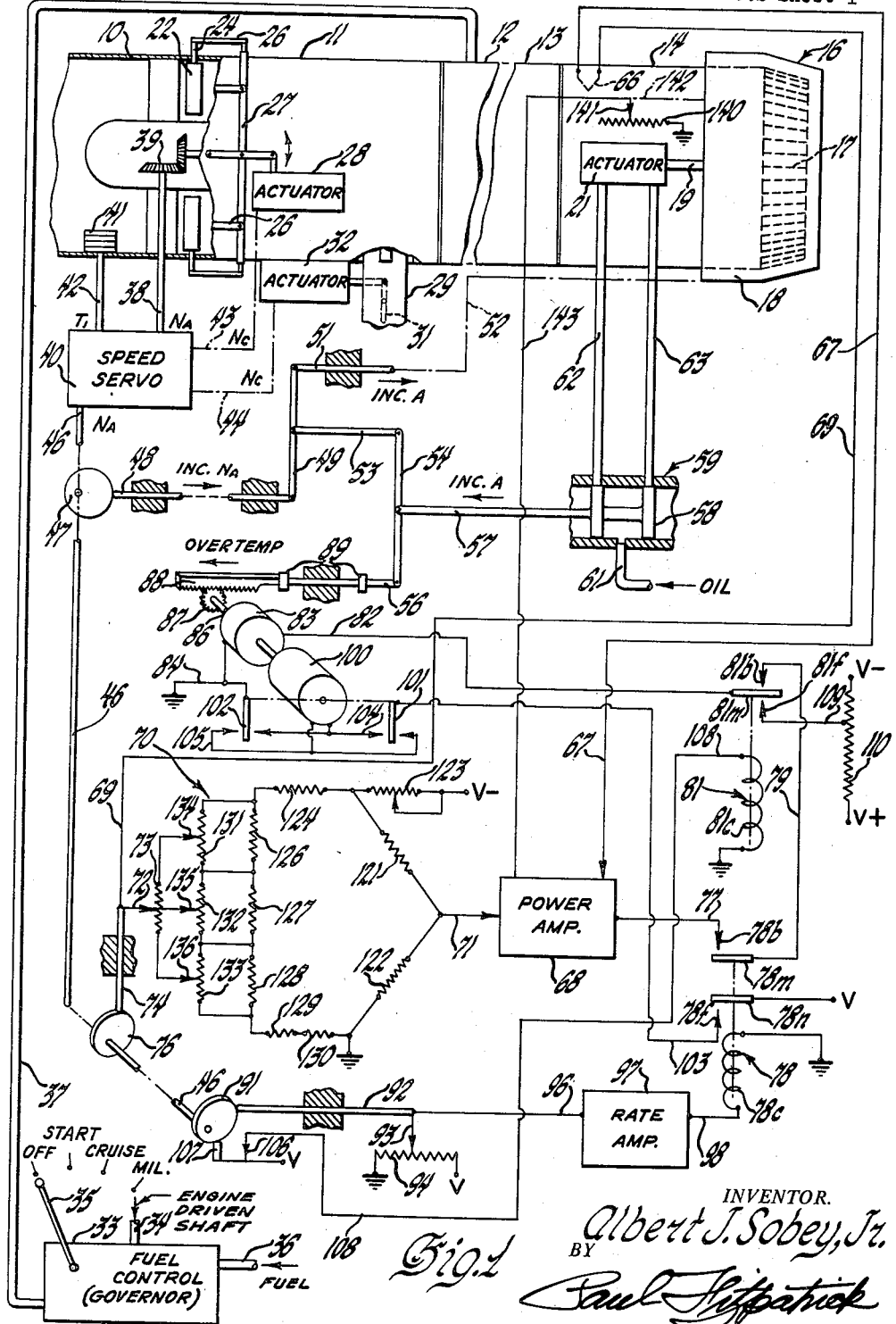
Figure 1 is a schematic diagram of the preferred embodiment of the invention associated with a turbojet engine.

Since the details of structure of the engine are immaterial to the invention and such engines are well known, the engine is illustrated only generally. The engine comprises an air inlet 10 through which air flows to a compressor 11. The compressor discharge air flows through combustion apparatus 12, a turbine 13, and an exhaust pipe 14. A variable jet nozzle apparatus 16 of any suitable type varies the area of the engine exhaust opening. A variable nozzle structure of one known type is illustrated schematically. The nozzle comprises an annular assembly of flaps or leaves 17 coupled to a shroud 18 movable axially of the engine. Axial movement of the shroud causes the flaps, which are pivoted to the jet pipe, to move inwardly or outwardly to vary the nozzle area. The shroud is mechanically coupled by links 19 to one or more actuators 21 which may be of any suitable type and, as illustrated, are hydraulic cylinder and piston assemblies. The turbine 13 drives the compressor 11 through a coupling shaft (not illustrated).

Swirl is imparted to the air entering the compressor by a row of inlet guide vanes 22 mounted so as to be rotatable to a predetermined extent by shafts 24. Shafts 24 are coupled by arms 26 to a ring 27 extending around the compressor which may be rotated circumferentially of the compressor by one or more actuators 28. It will be understood that the guide vane structure illustrated is merely representative of any suitable variable geometry structure of the compressor. The actuator 28 may be any suitable device, ordinarily a servomechanism, capable of moving the vanes to a desired position in response to an inlet signal which determines the desired vane angle.

Air is bled from the compressor at one or more stages thereof through bleed means represented schematically by the bleed pipe 29 controlled by a valve 31 which may be moved from the open position shown to a closed position by a suitable servomechanism or actuator 32.

The operation of the engine is controlled primarily by a fuel control 33 which may be of any suitable known type. Such controls include means by which the engine fuel may be shut off and may be varied from that required to start the engine up to the maximum power setting which may be termed "Military." The control includes a speed governor (not illustrated) driven by a shaft 34 driven by the engine. The fuel control is directly or indirectly connected to a pilot's power control lever 35 by which the engine power setting is determined. Fuel is supplied from suitable pumping means (not shown), which may be driven by the engine, through a line 36 to the fuel control and discharged through conduit 37 from the fuel control into the combustion apparatus 12. It will be understood that the lever 35 varies the setting of the governor in the fuel control as it is moved over the range from Start to Military.

The speed $N_A$ of the engine is sensed by a shaft 38 driven from the engine through gearing 39. This is the actual speed of the engine which will hereafter be termed simply "speed." Shaft 38 provides the speed input to a speed servo 40 which may be a device such as that described in U.S. Patent 2,824,426. The speed servo also receives an input of inlet air temperature from a temperature bulb 41 in the inlet 10 connected to the speed servo through a pressure conduit 42.

The speed servo includes servomechanisms which provide an output of engine speed and an output of corrected engine speed indicated as "$N_c$" on the drawing. Corrected engine speed is engine speed multiplied by the square root of the absolute temperature of the inlet air. The corrected speed is thus a measure of speed in terms of the velocity of sound in air and is a parameter most suitable for control of the variable vanes and compressor bleed. The speed servo is connected by suitable means 43 and 44 to the actuators 28 and 32, respectively. The means 43 and 44 may be of any character suitable for the particular type of actuator, such as a mechanical transmission, an electrical potential signal carrying lead, or a fluid pressure signal conduit. Preferably, a mechanical transmission from the speed servo to the actuator input is employed. Either the speed servo or the actuators, or both, may include cams (not shown) to convert $N_c$ into the desired actuator movement.

Actual engine speed derived from the speed servo is employed for several functions in the control system. As illustrated, the speed servo drives an actual speed output shaft 46 which is rotated in proportion to engine speed and which drives three cams to be described.

The cam 47 on shaft 46 is a part of what may be termed a speed-area control means which establishes a predetermined relation between engine speed and nozzle area and is coupled to the nozzle actuator 21. The speed-area control means includes a slidable cam follower 48 coupled to one end of a differential device providing an area error deriving means, illustrated as a floating lever 49. The other end of lever 49 is coupled to a slidably mounted rod 51 mechanically coupled through suitable transmission means 52 to the shroud 18 of the variable nozzle. As will be apparent, the position of the midpoint of lever 49 represents the difference between shroud position and the position scheduled by cam 47. Since shroud position determines nozzle area, cam 47 may be contoured to provide the desired relation between speed and nozzle area. The midpoint of lever 49 is coupled by a link 53 to one end of a second floating lever 54 which constitutes a second differential or summing device. The other end of floating lever 54 is coupled to a slidable member 56 which provides a temperature-responsive control of nozzle area. So far as the present discussion is concerned, however, we may pass over the function of member 56 and assume it to have a constant position. If member 56 is in any fixed position, the movements of link 53 are communicated through floating lever 52 to the stem 57 of valve spool 58 of a suitable reversing valve 59. Oil is supplied under pressure to valve 59 through line 61, and from the valve through lines 62 and 63 to the hydraulic cylinder or actuator 21. When the valve spool is moved to the left, as shown, the actuator moves the shroud to the rear, increasing the nozzle area, and vice versa. As will be apparent, therefore, the structure just described determines a nozzle area as a function of engine speed subject to modification, trimming or overriding by movement of member 56.

We may now proceed to the temperature control of nozzle area which is effected through movement of member 56 by means responsive to turbine temperature, means responsive to engine speed establishing a scheduled turbine temperature, and means responsive to the actual and scheduled turbine temperatures to control the position of member 56 and thus the nozzle area. Actual turbine temperature is sensed by thermocouples 66, preferably mounted in the exhaust duct downstream of the turbine to measure turbine outlet temperature. The thermocouples are connected by a lead 67 to a power amplifier 68 and by lead 69 to a bridge circuit, identified generally as 70, which is connected to the power amplifier through lead 71. The thermocouples provide an E.M.F. proportional to turbine outlet temperature and the bridge circuit subtracts from this E.M.F. an E.M.F. indicating the desired temperature. The difference of the two E.M.F.'s, which represents the temperature error, is fed to the power amplifier through lines 67 and 71. The lead 69 is connected into the bridge circuit by sliding contact 72 of a potentiometer 73. Contact 72 is shifted by a cam follower 74 actuated by cam 76 on shaft 46. The details of the bridge circuit will be passed over for the present, but it will be noted that movement of the slider 72 provides a signal of desired turbine outlet temperature which is a function of engine speed as desired in accordance with the characteristics of the engine, the cam 76 being contoured to provide the desired schedule.

In normal steady state operation, the output of the power amplifier is delivered through lead 77 and back contact 78b and movable contact 78m of an acceleration cutout relay 78. Contact 78m is connected through lead 79, back contact 81b and movable contact 81m of a low speed cutout relay 81, and lead 82 to a motor 83 which is grounded at 84. As will be apparent, a D.C. motor of the permanent magnet field type is illustrated, although the invention is not limited to a direct current motor. The shaft 86 of the motor is rotated in one direction or the other depending upon the direction of current flow. In an A.C. system, the motor could respond to phase angle of the current. Shaft 86 is connected by suitable gearing, illustrated by pinion 87 and rack 88, to the slidable member 56 previously referred to, which may include limit stops 89 to limit its range of reciprocation.

If the temperature sensed by the thermocouples 66 is higher than that established by cam 76, the motor will rotate to move the member 56 to the left, as illustrated in the figure. This will move valve spool 58 to move the nozzle in the opening direction. The movement of the shroud 18 will feed back through transmission 52, 51, floating lever 49, link 53, and floating lever 54. However, the motor 83 will continue to move until the temperature is reduced to the scheduled value, when the valve will close to hold the nozzle at the proper area. In case of under-temperature, the temperature response operates to close the nozzle.

As previously mentioned, the temperature responsive control is disabled during engine acceleration. A suitable means for accomplishing this comprises cam 91 on shaft 46 operating cam follower 92 which moves contact 93 over a potentiometer 94 connected between a suitable source of fixed voltage indicated by the letter "V" and ground. The rate of movement of contact 93 and thus the rate of change of the voltage taken off the potentiometer is determined by the rate of change of engine speed. Preferably the devices 91, 92, 93 are such that voltage at 93 is a linear function of engine speed. Contact 93 is connected by lead 96 to a rate amplifier 97, preferably a magnetic amplifier, which responds to the rate of change of voltage in line 96. If this rate of change is above a predetermined value, the rate amplifier provides a sufficient output through line 98 to coil 78c of acceleration cutout relay 78 to move the movable contact 78m of the relay away from contact 78b and move contact 78n against front contact 78f. When relay 81 is thus actuated, the motor 83 is disconnected from the power amplifier and de-energized. The temperature responsive control of nozzle area is thus disabled.

It should be understood that this cutout is not effective during slow adjustments of engine speed. However, it is common practice in operating such engines to shift the control lever sharply, as for example, when shifting from Idle to Cruise or Military or cutting back to Idle. In such cases, the engine accelerates rapidly. The threshold of response of amplifier 97 and relay 98 is below the normal minimum acceleration rate of the engine (which depends upon the characteristics of the engine) when it responds to abrupt and substantial movements of lever 35.

During such accelerations, nozzle area control is returned to the speed-area scheduling control by cam 47, previously described. This requires that slider 56 be fixed in a definite datum position in the apparatus shown. Any suitable means for accomplishing this may be employed. As illustrated, a second electric motor 100 mechanically coupled to shaft 86 and to reversing switches 101 and 102 is provided. Switches 101 and 102 act as centering switches, causing motor 100 to drive to a datum position from whatever position it may be in when motor 100 is energized. When this datum position is reached, the switches open. Motor 100 is energized by acceleration cutout relay 78 from a source V through contacts 78n and 78f, lead 103, switch 101, and lead 104 or 105. The motor armature is grounded through lead 105 or 104 and switch 102.

The temperature control of the nozzle area by power amplifier 68 and motor 83 is also disabled in the lower speed range of the engine corresponding to starting and ground idle operation of the engine. This is preferably effected by means responsive to engine speed, although an approximation could be made by means responsive to the position of power lever 35. This control, as illustrated, is effected by a normally closed switch 106 opened by cam follower 107 engaged by cam 91 when the engine reaches a speed above the normal ground idle speed. Switch 106 connects a current source indicated as "V" through line 108 to the coil 81c of relay 81. When the coil is thus energized, the movable contact 81m is pulled away from the back contact 81b and into engagement with front contact 81f, which is connected through line 109 to a tap on a voltage divider 110 connected between the positive and negative terminals of the current supply. The voltage tapped off the divider 110 by the relay is supplied to motor 83 through line 82 and is of such polarity as to cause the motor to run in the nozzle opening direction until the slider 56 is driven to its limit of motion.

A similar result could be obtained by de-energizing motor 83 and energizing motor 100 to move the slider 57, 56 to its datum position, but the overtravel in the opening direction created by the control described is not harmful.

Proceeding now to the bridge circuit 70, which provides the speed-temperature schedule, the bridge comprises voltage dividing resistors 121 and 122 connected in series between a constant voltage source identified as V- and ground. A variable calibrating resistor 123 provides for adjusting the voltage on the bridge circuit. The power amplifier lead 71 is connected between resistors 121 and 122.

The other side of the bridge comprises a first series circuit through resistors 124, 126, 127, 128, and temperature compensating resistors 129 and 130. The compensating resistors are temperature-sensitive and serve to compensate for variations in the cold junction temperature of the thermocouple circuit. Resistor 124 serves to balance resistors 129 and 130 at the datum temperature. Resistors 126, 127, and 128 provide a voltage divider circuit. Three control characteristic adjusting potentiometers 131, 132, and 133 are connected in parallel with the voltage dividing resistors 126 to 128, respectively. The adjustable sliders 134, 135, and 136 of these potentiometers are connected respectively to one end, a center tap, and the other end of temperature scheduling potentiometer 73. Passing over, for the moment, the purpose of the potentiometers 131 to 133, it will be seen that with a given voltage at the junction between resistors 121 and 122, a definite potential will be applied to lead 71. The potential tapped off by slider 72 will vary from that of lead 71 depending upon the setting of the slider 72 by cam 76. The potential difference between lead 71 and tap 72 is opposed to the potential difference of the thermocouples 66 in the series circuit connected to the amplifier input. As previously stated, this potential difference actuates the power amplifier to cause the motor 83 to work through the linkage and valve 59 to close the nozzle if the temperature is too low and open it if the temperature is too high. Closing the nozzle increases the back pressure on the turbine and reduces its speed. The governor then supplies more fuel to the engine to bring its speed up to the setting, thereby raising the temperature. The engine thus provides the feed-back of the control system. If the temperature is higher than that set, the opposite action takes place.

The three potentiometers 131 to 133 provide a convenient means for adjusting the characteristic curve of the speed temperature signal potentiometer 73. By shifting the sliders of these potentiometers, the potential at either end or the midpoint of potentiometer 73 can be varied. These potentiometers thus provide for adjusting the temperature setting corresponding to low, medium, and high points of the range of speeds. By moving slider 134, the temperature setting at low speed can be raised or lowered with a corresponding change in the slope of the curve to the midrange. Moving slider 135 changes the temperature setting at the midrange point and thus the slope of the speed temperature curve to each of the end points. Similarly, shifting slider 136 changes the slope of the curve from the midpoint to the high end. The characteristic may be raised or lowered uniformly by shifting all three sliders.

In order to stabilize the action of the power amplifier and, in general, of the temperature control of area, a nozzle position feed-back to the power amplifier is provided. A grounded resistor 140 cooperates with a movable tap 141 coupled by a suitable mechanical connection 142 to the shroud 18. Tap 141 is connected by lead 143 to power amplifier 68. The variation of resistance from tap 141 to ground with movement of the shroud is employed to provide a velocity feed-back signal to the power amplifier which is employed in known manner to stabilize the followup system and prevent hunting of the nozzle shroud.

Operation

Figure 2:
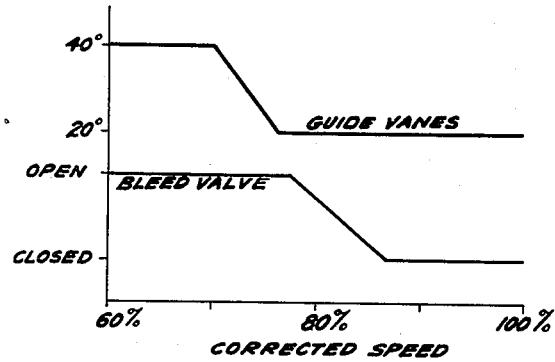
Figure 2 is a diagram representing the operation of the guide vanes and bleed valve.

The operation of the system will be described beginning with the starting of the engine, which may be accomplished in any usual manner. While the engine is being started and brought up to a self-sustaining idling speed, the nozzle 16 is held open. Cam 47 calls for an open nozzle at low engine speed. Low engine temperatures cannot call for a closed nozzle through the temperature-area control system since this is disabled by switch 106 which causes the motor 83 also to call for open area. It will be understood that the idle speed of such an engine may be of the order of 40% to 50% of its maximum speed and that flight operation normally requires that the engine operate above about 80% maximum speed. These values may vary from one engine to another, as also other illustrative values mentioned later. During starting and low speed operation of the engine, the guide vanes are set at the maximum 40 degree angle and the bleed valve is open, as illustrated in Figure 2. At some value of engine speed, such as about 70%, the speed servo begins to shift the guide vanes progressively to the minimum 20 degree angle, which is reached at about 76% speed. At about 77% speed, the speed servo begins to close the bleed valve, which is completely closed at about 87% speed. Since these actions take place in response to corrected speed, these values correspond to actual engine speed only for standard inlet temperature. If temperature is higher or lower, the actual engine speed will be higher or lower. It will be noted that the shifting of the guide vanes and closing of the bleed valve occur over a substantial range of engine speed so that the characteristics of the engine vary gradually and there are no sharp changes in fuel consumption or thrust such as would result if the vanes were shifted or the valve closed immediately when the speed reached a particular value. It is preferable to have the speed ranges through which the guide vanes and bleed valve actuators work non-overlapping so that the two effects take place successively, since this provides a smoother transition. The values of speed through which these transitions occur must depend, however, upon the characteristics of the engine.

Figure 3:
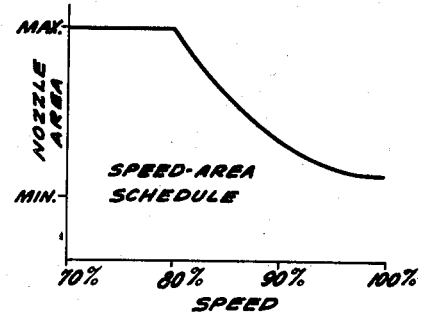
Figure 3 is a diagram illustrating the variation of nozzle area by the speed-area schedule.

At some speed above the ground idle speed of the engine, switch 106 is opened and low speed cutout relay 81 is de-energized. This activates the temperature-area control which can serve to trim or adjust nozzle area to a greater or smaller value than that called for by the speed-area schedule cam 47, within the limits of nozzle area. Figure 3 shows a typical nozzle area schedule defined by cam 47. At low engine speeds the nozzle is fully open. At some speed at the lower part of the normal operating range the cam calls for closing movement of the nozzle progressively to a value near the minimum area at full engine speed. The speed-area schedule is preferably such as to give the desired turbine outlet temperature, at least approximately, under normal temperature of the air entering the engine. It will be realized, of course, that the turbine outlet temperature is a function of the temperature of the air entering the engine and also of other factors such as forward speed of the aircraft. The speed-area control, however, provides a first approximation to the desired nozzle area which is corrected by the temperature-area control to bring the nozzle to the exact area to provide the turbine outlet temperature scheduled as a function of speed to provide the best operating characteristics and specific fuel consumption for the engine.

Figure 4:
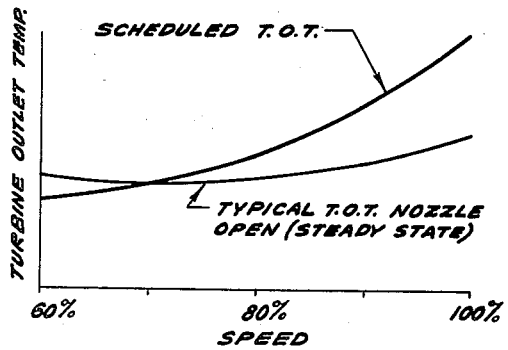
Figure 4 is a diagram illustrating the relation to speed of scheduled turbine outlet temperature and steady state outlet temperature with the nozzle open.
Figure 5:
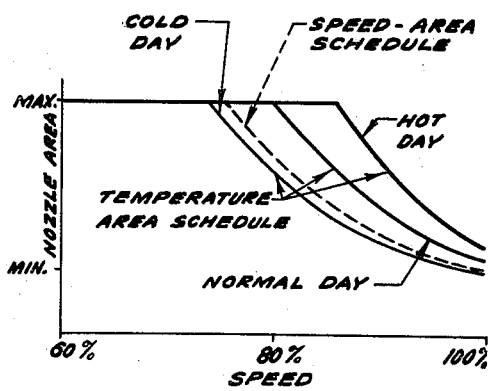
Figure 5 is a diagram illustrating the variation of nozzle area by the temperature-area schedule control.

The nature of the control is further illustrated by Figure 4 in which the curve indicated as typical T.O.T. nozzle open (steady state) represents the turbine outlet temperature of the engine as a function of speed under standard or typical conditions with the nozzle open. It will be noted that the temperature rises somewhat over the latter part of the speed range but remains well below the maximum value required for maximum thrust. The curve identified as scheduled T.O.T. represents the schedule of turbine outlet temperature against speed determined by cam 76 and potentiometer 73. The scheduled temperature is below the actual outlet temperature with the nozzle open at low engine speeds under steady state conditions. Under these conditions, therefore, the temperature control tends to leave the area open. However, at speeds above the point where the two curves cross the temperature control acts to close the nozzle to bring the T.O.T. up to the scheduled value. The steady state turbine outlet temperature may be higher or lower, depending upon inlet air temperature and other conditions. Therefore, the point at which the temperature control begins to close the nozzle may vary. This is illustrated by Figure 5, on which the temperature-area schedule curves indicate that the nozzle is open at low speeds, and at some value of speed begins to be closed by the temperature-area control. On a hot day, the closing begins at a higher speed and the nozzle does not close as fully as on a cold day.

Figure 6:
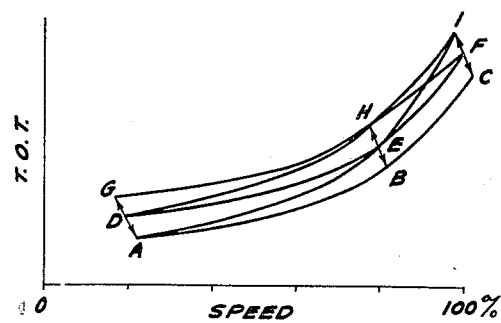
Figure 6 is a diagram illustrating the adjustment of the temperature-area schedule.

The adjustment of the temperature-area schedule is illustrated by Figure 6. Assuming that potentiometer 73 is linear, which it may be, cam 76 is contoured to provide a temperature schedule of the character illustrated as scheduled T.O.T. in Figure 4. The actual schedule is based upon computed or observed values of nozzle area which provide the best specific fuel consumption at each speed, under the conditions of altitude, aircraft speed, and so forth, for which the engine is designed. The potentiometers 131 to 133 provide a flexible and convenient means for adjusting the temperature schedule both as to the general level of temperature and as to the slope of the upper and lower parts of the curve. Referring to Figure 6, the curve DEF might represent the average curve obtained with the sliders 134 to 136 at the midpoints of the potentiometers. The curve GHI represents the schedule obtained when the sliders are all adjusted to provide a high temperature schedule. The curve ABC is a low temperature schedule obtained by shifting the sliders in the opposite direction. Any curve which intersects the line AG at a given point, the line BH at a given point, and the line CI at a given point may be obtained. For example, the curve AEI starts at a low temperature and ends at a high temperature. The curve DHF begins and ends at intermediate temperatures but calls for a relatively high temperature at the midpoint. As will be apparent, the three adjustments of the potentiometers, which can be very easily made, can serve to adjust the control to engines of different series having somewhat different characteristics or to the individual differences between engines of a series, or may be adjusted during the service life of the engine as its characteristics change somewhat because of such effects as wear and fouling of the parts.

We may now consider the reasons for the shift to the speed-area control from the temperature-area control during engine acceleration. Assuming, for example, that the aircraft is flying at a low speed cruise condition and the pilot wants maximum thrust as soon as possible, he will move the control lever 35 to the Military setting. The pilot's desire is for as much thrust as possible as soon as possible. A certain amount of time is required for the engine to accelerate. During the acceleration, the fuel is increased above that for steady state running and the turbine exhaust temperature rises above the steady state temperature corresponding to the instantaneous engine speed. Temperature control would tend to open the nozzle in response to this increase in temperature. Opening the nozzle would reduce thrust. By disabling the temperature control, the nozzle is caused to go onto the speed-area schedule which holds it at the opening normally corresponding to the particular engine speed and gradually closes the nozzle as the speed increases. Thrust thus builds up as soon as the control lever is advanced. As a result of the interruption of the temperature control of area, there may be a temporary overtemperature in the turbine, which can be tolerated, and which increases the acceleration rate of the engine. When the engine accelerates to the new speed level set by the governor, the governor reduces fuel, acceleration rapidly drops off, and, as soon as the acceleration rate is below that to which the rate amplifier responds, the amplifier de-energizes relay 78 to disable motor 100 and put the temperature control motor 83 back in action. If the turbine is running over scheduled temperature, this motor will then cause the nozzle to open. It is possible, if the air entering the engine is very cold that turbine outlet temperature will be below that scheduled for the engine speed, in which case the temperature control will close the nozzle further, increasing the thrust to the maximum available under the power lever setting.

When the engine is decelerated, as, for example, when the pilot cuts the throttle to Idle during a landing approach, it is also desirable to cut out the temperature control, which is done in response to the negative acceleration rate of the engine. When the pilot pulls back the throttle, the governor setting is lowered and the governor reduces the fuel supplied to the combustion apparatus. The temperature control would tend to close the nozzle because the reduction of fuel causes an immediate lowering of turbine outlet temperature. This would tend to maintain the thrust and might result in compressor surge or stall as the engine speed drops. With the temperature control cut out, the nozzle is opened on the speed-area schedule as engine speed decreases. This reduces the thrust, which is desired, and also reduces the back pressure transmitted from the nozzle through the turbine to the compressor preventing excessive compressor outlet pressures at lower speeds which might result in surge or stall of the compressor. When the engine speed stabilizes, the temperature control is put back into effect, unless the speed is below that at which it is cut out by the low speed cutout relay 81.

We may now refer to another advantage of the low speed cutout relay. Switch 106 is adjusted so that it opens at an engine speed which is above the idling speed of the engine under ground idling or low altitude flight idle conditions. However, it is characteristic of such engines that their idling speed is greater at high altitudes than at low. Switch 106 preferably opens at a speed below idling speed at higher altitudes, such as 40,000 feet or more. Therefore, if the engine control is moved for any reason to a very low power setting during flight at high altitudes, the advantages of the temperature control are retained. It will be understood, of course, that the amount of fuel supplied for idling operation at low altitudes where the air is dense presents no hazard of turbine overtemperature. However, at high altitudes the minimum amount of fuel which will operate the engine creates a substantially higher turbine temperature. In fact, the altitude limit of engines of this sort may be the result of the intersection of the curve of minimum fuel rate required to run with the curve of maximum fuel rate determined by allowable turbine temperature.

Figure 7 is a schematic diagram similar to that of Figure 1 of a modified control system which is similar to that of Figure 1 in many respects. For that reason it will not be described in the detail with which Figure 1 has been described. Parts corresponding to those of Figure 1 are identified by the same reference numerals. The engine, speed servo, guide vane and bleed valve system, and nozzle actuator may be identical to those previously described. The speed-area control may be basically the same, differing only in structural details of the interconnections to the temperature-area control and in that it would ordinarily be scheduled for a colder day rather than an average or normal day.

The principal difference between the system of Figure 7 and that of Figure 1 is that the speed servo not only establishes a speed-area control for the nozzle, it also establishes a schedule of minimum nozzle area which limits the action of the temperature-area control in closing the nozzle. This makes it possible to eliminate some of the apparatus of the system of Figure 1, principally the means for setting the temperature control in a datum position when it is cut out and the low speed cutout of the temperature control. The temperature-area control and the acceleration responsive cutout may be essentially the same as those previously described.

The speed-area control and the temperature-area control are combined in the control of Figure 7 in such a way that the temperature-responsive control may only increase the nozzle area above that scheduled by the speed-area control. One way in which this may be accomplished is illustrated schematically in Figure 7. The speed cam 151, corresponds to the cam 47 of Figure 1, is connected to the servo valve stem 57 through the member 56 which is also movable by the temperature control motor 152 corresponding to the motor 83 previously described. Cam 151 engages a rocker arm 153 pivoted on the fixed structure 154. The other end of the rocker arm engages an abutment 156 on an extension 157 of member 56 and rack 88. A compression spring 158 mounted between the structure 154 and an abutment 159 on rack 188 biases member 56 to the right, which is the direction of movement to decrease nozzle area, and maintains member 156 in engagement with the rocker arm 153 and the latter in engagement with the cam unless motor 152 moves the rack to the left. Lever 161 corresponds to floating lever 49, but one end of the lever is provided with a fixed pivot at 162. The feed-back from the nozzle is transmitted through lever 161, link 53, and floating lever 54 to the valve stem 57 as previously described. If motor 152 is inoperative, the area signal is transmitted from cam 151 through rocker 153, slidable member 56, and the floating lever 54. The operation of the speed-area control is, therefore, the same as that previously described.

The scheduling of temperature as a function of speed is accomplished by cam 76 and the bridge circuit 70 previously described. The temperature signal from the bridge circuit and the temperature response from the thermocouples 66 are fed to the power amplifier and generate a signal supplied to motor 152. The output of the power amplifier is fed through lead 77, back contact 78b and movable contact 78m of the acceleration cutout relay 78, and lead 164 to motor 152, and thence to ground through lead 84. Motor 152 may be a torque motor which generates a torque conditioned by the strength of the signal delivered by the power amplifier. If the power amplifier tends to drive the motor so as to call for a smaller nozzle area in response to turbine temperature lower than that scheduled, this movement is limited by cam 151. Motor 152 may, however, drive slider 56 freely to the left as shown to increase area if the turbine is over scheduled temperature. The speed rate cam 91, potentiometer 94, rate amplifier 97, and acceleration cutout relay 78 operate as previously described, although some of the functions of the acceleration cutout relay have been eliminated. The low speed cutout relay and its actuating means are eliminated, since they are not needed. The cam 151 may be contoured to hold the nozzle fully open at low engine speeds, thus preventing the motor 152 from closing the nozzle.

In the system of Figure 7, the speed-area cam 151 establishes the basic schedule of nozzle area which may be increased in area by the temperature-area control under steady state conditions, but not under acceleration conditions when the temperature-area control is cut out by relay 78.

It does not appear that any extended description of the operation of the modified system is called for. An obvious advantage over the system first described is greater simplicity. An important advantage, not so readily apparent, is that it will function more satisfactorily in the event of some types of failure of the electrical components or the loss of electric power. If the electrical system fails in the system of Figure 7 so as to de-energize motor 152, nozzle area will be controlled directly and entirely by the speed-area cam 151. Spring 158 will hold follower 153 against the cam. While overtemperature protection will be lost, this is material only if ambient air temperature is above that for which the speed-area schedule is computed. In this case, it will be up to the pilot to guard against overtemperature by reducing fuel flow. If ambient temperature is at or below that for which the speed-area schedule is computed, operation will be normal. Since the mechanical speed-area control is inherently much more reliable than the electronic temperature-area control, this is a significant point.

The principal disadvantage of the system of Figure 7 lies in the fact that if steady state turbine outlet temperature is lower than the optimum value, the temperature control cannot close the nozzle to increase the temperature. This disadvantage may be minimized, however, by scheduling the speed-area control to provide the optimum nozzle area schedule under relatively cold day conditions, so that ordinarily the engine is operating in warmer air and the correction of nozzle area is in the opening direction to decrease turbine temperature. If the temperature of incoming air is below that for which the speed-area cam is scheduled, the result will be that the engine will run somewhat cooler than the optimum value and some thrust will be lost. This condition is exceptional and, therefore, the disadvantage is not serious. By way of further explanation, it may be pointed out that the speed-area schedule of the control of Figure 7 might approximate the curve shown as "cold day" on Figure 5 or be intermediate between the cold day and normal day curves. Such a schedule is illustrated in broken lines on Figure 5. The area below the broken line schedule is not available, but the temperature control may open the nozzle as required above this schedule.

It may be pointed out that no attempt has been made to delineate realistic cam contours in Figures 1 and 7. The specific contours would depend, of course, upon the operating characteristics and physical structure of a particular engine and upon the configuration of the transmission means between the controls and the operated devices. The general nature of the cams will be apparent from Figures 2 to 6 and the detailed contours in any specific case may be readily determined from the engine operating characteristics and the mechanical configuration of the linkages.

It will be understood also that the various cam and follower arrangements illustrated include conventional means to insure that the follower remain in engagement with the cam surface or track.

It will be apparent to those skilled in the art that the invention provides a control particularly adapted to secure the optimum performance from turbojet engines. Turbine temperature scheduled by speed provides the best basis for nozzle area control except during transient conditions, when speed provides a satisfactory control.

The detailed description of preferred embodiments of the invention to explain the principles thereof is not to be considered as limiting the invention, as many modifications may be made by the exercise of skill in the art within the principles of the invention.

I claim:

1. In combination with a gas turbine engine including a compressor, combustion apparatus, a turbine driving the compressor, and a variable area exhaust nozzle for the turbine, a control system comprising, in combination, settable means including a variable engine speed governor for controlling the engine fuel supply, actuator means connected to the exhaust nozzle operable to vary the nozzle area progressively from a maximum to a minimum value, speed-area control means responsive to engine speed connected to the actuator means establishing a schedule of nozzle area from maximum area at a predetermined engine speed to a relatively small area at maximum engine speed, speed-temperature control means responsive to engine speed establishing a schedule of turbine temperature against engine speed, turbine temperature control means responsive to turbine temperature and the temperature scheduled by the speed-temperature control means, and coupling means connecting the speed-area and turbine temperature control means to the actuator means so that the nozzle area is jointly controlled thereby.

2. In combination with a gas turbine engine including a compressor, combustion apparatus, a turbine driving the compressor, and a variable area exhaust nozzle for the turbine, a control system comprising, in combination, settable means including a variable engine speed governor for controlling the engine fuel supply, actuator means connected to the exhaust nozzle operable to vary the nozzle area progressively from a maximum to a minimum value, speed-area control means responsive to engine speed connected to the actuator means establishing a schedule of nozzle area from maximum area at a predetermined engine speed to a relatively small area at maximum engine speed, speed-temperature control means responsive to engine speed establishing a schedule of turbine temperature against engine speed, turbine temperature control means responsive to turbine temperature and the temperature scheduled by the speed-temperature control means, coupling means connecting the speed-area and turbine temperature control means to the actuator means so that the nozzle area is jointly controlled thereby, and means responsive to a condition indicative of engine speed effective to disable the turbine temperature control means when said condition is below a predetermined range.

3. In combination with a gas turbine engine including a compressor, combustion apparatus, a turbine driving the compressor, and a variable area exhaust nozzle for the turbine, a control system comprising, in combination, settable means including a variable engine speed governor for controlling the engine fuel supply, actuator means connected to the exhaust nozzle operable to vary the nozzle area progressively from a maximum to a minimum value, speed-area control means responsive to engine speed connected to the actuator means establishing a schedule of nozzle area from maximum area at a predetermined engine speed to a relatively small area at maximum engine speed, speed-temperature control means responsive to engine speed establishing a schedule of turbine temperature against engine speed, turbine temperature control means responsive to turbine temperature and the temperature scheduled by the speed-temperature control means, coupling means connecting the speed-area and turbine temperature control means to the actuator means so that the nozzle area is jointly controlled thereby, and means responsive to engine acceleration connected to the turbine temperature control means effective to disable the turbine temperature control means when engine acceleration exceeds a predetermined range.

4. In combination with a gas turbine engine including a compressor, combustion apparatus, a turbine driving the compressor, and a variable area exhaust nozzle for the turbine, a control system comprising, in combination, settable means including a variable engine speed governor for controlling the engine fuel supply, actuator means connected to the exhaust nozzle operable to vary the nozzle area progressively from a maximum to a minimum value, speed-area control means responsive to engine speed connected to the actuator means establishing a schedule of nozzle area from maximum area at a predetermined engine speed to a relatively small area at maximum engine speed, speed-temperature control means responsive to engine speed establishing a schedule of turbine temperature against engine speed, turbine temperature control means responsive to turbine temperature and the temperature scheduled by the speed-temperature control means, coupling means connecting the speed-area and turbine temperature control means to the actuator means so that the nozzle area is jointly controlled thereby, means responsive to engine acceleration connected to the turbine temperature control means effective to disable the turbine temperature control means when engine acceleration exceeds a predetermined range, and means responsive to a condition indicative of engine speed effective to disable the turbine temperature control means when said condition is below a predetermined range.

5. In combination with a gas turbine engine including a compressor, combustion apparatus, a turbine driving the compressor, a variable area exhaust nozzle for the turbine, variable stator vanes in the compressor, and means for bleeding air from the compressor, a control system comprising, in combination, settable means including a variable engine speed governor for controlling the engine fuel supply, means responsive to corrected engine speed connected to the vanes to vary the setting thereof progressively over a range of engine speed, means responsive to corrected engine speed connected to the bleeding means to close the bleeding means progressively over a range of engine speed, actuator means connected to the exhaust nozzle operable to vary the nozzle area progressively from a maximum to a minimum value, speed-area control means responsive to engine speed connected to the actuator means establishing a schedule of nozzle area from maximum area at a predetermined engine speed to a relatively small area at maximum engine speed, speed-temperature control means responsive to engine speed establishing a schedule of turbine temperature against engine speed, turbine temperature control means responsive to turbine temperature and the temperature scheduled by the speed-temperature control means, and coupling means connecting the speed-area and turbine temperature control means to the actuator means so that the nozzle area is jointly controlled thereby.

6. In combination with a gas turbine engine including a compressor, combustion apparatus, a turbine driving the compressor, a variable area exhaust nozzle for the turbine, variable stator vanes in the compressor, and means for bleeding air from the compressor, a control system comprising, in combination, settable means including a variable engine speed governor for controlling the engine fuel supply, means responsive to corrected engine speed connected to the vanes to vary the setting thereof progressively over a range of engine speed, means responsive to corrected engine speed connected to the bleeding means to close the bleeding means progressively over a range of engine speed, actuator means connected to the exhaust nozzle operable to vary the nozzle area progressively from a maximum to a minimum value, speed-area control means responsive to engine speed connected to the actuator means establishing a schedule of nozzle area from maximum area at a predetermined engine speed to a relatively small area at maximum engine speed, speed-temperature control means responsive to engine speed establishing a schedule of turbine temperature against engine speed, turbine temperature control means responsive to turbine temperature and the temperature scheduled by the speed-temperature control means, coupling means connecting the speed-area and turbine temperature control means to the actuator means so that the nozzle area is jointly controlled thereby, means responsive to engine acceleration connected to the turbine temperature control means effective to disable the turbine temperature control means when engine acceleration exceeds a predetermined range, and means responsive to a condition indicative of engine speed effective to disable the turbine temperature control means when said condition is below a predetermined range.

7. A control system for a turbojet engine having a variable area jet nozzle, the control system comprising, in combination, first means responsive to engine speed operative to provide a schedule of turbine temperature as a function of speed, means responsive to actual turbine temperature providing a signal representative thereof, area control means controlled by said first means and said temperature responsive means operable in response to the difference between scheduled and actual turbine temperature coupled to the nozzle to vary the area thereof, second means responsive to engine speed operative to provide a schedule of nozzle area as a function of speed, and means connecting the second speed responsive means to the nozzle for joint control with the said area control means.

8. A control system for a turbojet engine having a variable area jet nozzle, the control system comprising, in combination, first means responsive to engine speed operative to provide a schedule of turbine temperature as a function of speed, means responsive to actual turbine temperature providing a signal representative thereof, area control means controlled by said first means and said temperature responsive means operable in response to the difference between scheduled and actual turbine temperature coupled to the nozzle to vary the area thereof, second means responsive to engine speed operative to provide a schedule of nozzle area as a function of speed, means connecting the second speed responsive means to the nozzle for joint control with the said area control means, and means disabling the said area control means during engine acceleration above a predetermined value.

9. A control system as recited in claim 8 including means responsive to engine acceleration operative to set the area control means to a datum position.

10. A control system as recited in claim 8 including means operative below a predetermined engine speed to override the area control means so as to call for an open nozzle.

11. A control system for a turbojet engine having a variable area jet nozzle, the control system comprising, in combination, first means responsive to engine speed operative to provide a schedule of turbine temperature as a function of speed, means responsive to actual turbine temperature providing a signal representative thereof, area control means controlled by said first means and said temperature responsive means operable in response to the difference between scheduled and actual turbine temperature coupled to the nozzle to vary the area thereof, second means responsive to engine speed operative to provide a schedule of nozzle area as a function of speed, means connecting the second speed responsive means to the nozzle for joint control with the said area control means, and means disabling the said area control means at engine speeds below a predetermined value and during engine acceleration above a predetermined value.

12. A control system for a turbojet engine having a variable area jet nozzle, the control system comprising, in combination, first means responsive to engine speed operative to provide a schedule of turbine temperature as a function of speed, means responsive to actual turbine temperature providing a signal representative thereof, area control means controlled by said first means and said temperature responsive means operable in response to the difference between scheduled and actual turbine temperature coupled to the nozzle to vary the area thereof, second means responsive to engine speed operative to provide a schedule of nozzle area as a function of speed, and means connecting the second speed responsive means to the nozzle for limiting the nozzle closing action of the said area control means.

13. A control system for a turbojet engine having a variable area jet nozzle, the control system comprising, in combination, first means responsive to engine speed operative to provide a schedule of turbine temperature as a function of speed, means responsive to actual turbine temperature providing a signal representative thereof, area control means controlled by said first means and said temperature responsive means operable in response to the difference between scheduled and actual turbine temperature coupled to the nozzle to vary the area thereof, second means responsive to engine speed operative to provide a schedule of nozzle area as a function of speed, means connecting the second speed responsive means to the nozzle for limiting the nozzle closing action of the said area control means, and means disabling the said area control means during engine acceleration above a predetermined value.

14. A control system as recited in claim 13 in which the second speed responsive means schedules an open nozzle below a predetermined speed range of the engine and thus holds the nozzle open by limiting the action of the area control means.

15. A control system for a turbojet engine having a variable area jet nozzle, the control system comprising, in combination, first means responsive to engine speed operative to provide a schedule of turbine temperature as a function of speed, means responsive to actual turbine temperature providing a signal representative thereof, area control means controlled by said first means and said temperature responsive means operable in response to the difference between scheduled and actual turbine temperature coupled to the nozzle to vary the area thereof, second means responsive to engine speed operative to provide a schedule of nozzle area as a function of speed, means connecting the second speed responsive means to the nozzle for limiting the nozzle closing action of the said area control means, and means disabling the said area control means during engine acceleration above a predetermined value, the second means overriding the area control means to call for an open nozzle below a predetermined engine speed.

16. A control system for a turbojet engine having a variable area jet nozzle, the control system comprising, in combination, first control means responsive to engine speed coupled to the jet nozzle, the first control means controlling nozzle area as a function of speed, and second control means responsive to engine speed and turbine temperature coupled to the jet nozzle, the second control means being operative to vary the nozzle area from that established by the first control means to maintain turbine temperature at a speed-scheduled value, the first control means being operative to provide an approximately correct speed-scheduled turbine temperature for predetedmined ambient air temperature, in the event of failure of the second control means.

17. A control system for a turbojet tengine having a variable area jet nozzle, the control system comprising, in combination, mechanical control means responsive to engine speed coupled to the jet nozzle, the mechanical control means controlling nozzle area as a function of speed, and electrical control means responsive to engine speed and turbine temperature coupled to the jet nozzle, the electrical control means being operative to vary the nozzle area from that established by the mechanical control means to maintain turbine temperature at a speed-scheduled value, the mechanical control means being operative to provide an approximately correct speed-scheduled turbine temperature for predetermined ambient air temperature, in the event of failure of the electrical control means.

18. A control system for a turbojet engine having a variable area jet nozzle, the control system comprising, in combination, mechanical control means responsive to engine speed coupled to the jet nozzle, the mechanical control means controlling nozzle area as a function of speed, electrical control means responsive to engine speed and turbine temperature coupled to the jet nozzle, the electrical control means being operative to vary the nozzle area from that established by the mechanical control means to maintain turbine temperature at a speed-scheduled value, the mechanical control means being operative to provide an approximately correct speed-scheduled turbine temperature for predetermined ambient air temperature, in the event of failure of the electrical control means, and means responsive to engine acceleration coupled to the electrical control means to disable the electrical control means when the acceleration exceeds a predetermined value.

References Cited in the file of this patent

UNITED STATES PATENTS

| 2,705,864 | Peters | Apr. 12, 1955 |
| 2,820,340 | Dolza | Jan. 21, 1958 |

FOREIGN PATENTS

| 750,480 | Great Britain | June 13, 1956 |
| 757,981 | Great Britain | Sept. 26, 1956 |